United States Patent [19]

Schmidt et al.

[11] 4,259,586
[45] Mar. 31, 1981

[54] CASSETTE FOR X-RAY FILM

[75] Inventors: Manfred Schmidt; Heinrich Färber, both of Munich, Fed. Rep. of Germany

[73] Assignee: AGFA-Gevaert, A.G., Leverkusen, Fed. Rep. of Germany

[21] Appl. No.: 949,138

[22] Filed: Oct. 6, 1978

[30] Foreign Application Priority Data

Oct. 13, 1977 [DE]  Fed. Rep. of Germany ....... 2746032

[51] Int. Cl.³ .............................................. G03C 5/16
[52] U.S. Cl. .................................................. 250/481
[58] Field of Search ................ 250/481, 480, 479, 482

[56] References Cited

U.S. PATENT DOCUMENTS

| 1,367,601 | 2/1921 | Hodgson | 250/481 |
| 2,530,321 | 11/1950 | Armstrong | 250/480 |
| 3,412,244 | 11/1968 | Sherwood | 250/480 |

*Primary Examiner*—Alfred E. Smith
*Assistant Examiner*—T. N. Grigsby
*Attorney, Agent, or Firm*—Peter K. Kontler

[57] ABSTRACT

A cassette for X-ray film has two rigid sections connected to each other by a hinge which forms the central portion of an opaque plastic foil bonded to the inner sides of the sections. One of the sections has a radiation-admitting opening which extends to the hinge and is bounded by elastic sealing lips forming integral parts of the foil. The foil has a hole for evacuation of air from the interior of the container when the two sections overlap and are locked to each other. X-ray film and an intensifying screen are placed into the container within the confines of the sealing lips to extend all the way to the hinge. The container can be used for the making of mammograms to image the breasts all the way to and inclusive of the adjacent parts of the chest.

24 Claims, 2 Drawing Figures

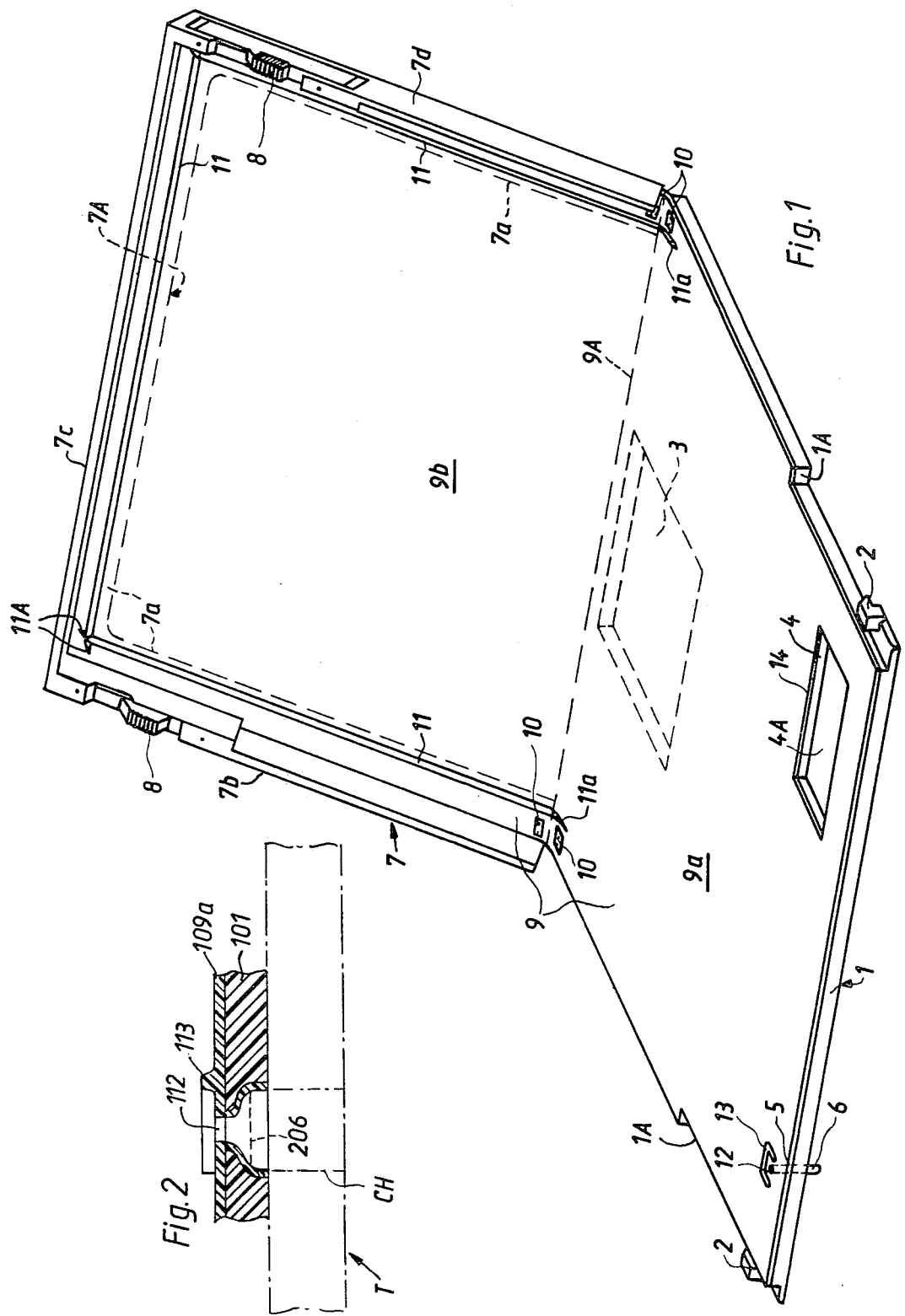

CASSETTE FOR X-RAY FILM

BACKGROUND OF THE INVENTION

The present invention relates to radiography in general, and more particularly to improvements in containers or cassettes for X-ray film.

It is known to assemble a container for X-ray film from two sections which are connected by one or more hinges and can be moved with respect to each other between open and closed positions. It is also known to equip such containers with locking devices which maintain the sections in closed positions when the sections confine an X-ray film, and to provide the containers with connections for evacuation of air from their interior.

Certain presently known containers for X-ray film, especially those which are used for the making of mammograms, are equipped with a foil (so-called intensifying screen) which enhances the contrast of the X-ray image and reduces the quantity of radiation to which a female patient must be exposed during imaging of her breasts. The quantity of radiation is reduced because the interval of exposure to X-rays is shorter due to the provision of the contrast-enhancing screen. A prerequisite for satisfactory cooperation between the contrast-enhancing or intensifying screen and X-ray film is that the film is placed as close to the screen as possible and that the pressure between each portion of film and the screen is uniform. As a rule, the film is connected to the screen by a discrete clamping or holding device before the thus obtained sandwich is inserted into a conventional container. The clamping devices, the means for preventing penetration of light, and the hinges which couple the sections of conventional containers to each other contribute excessively to the complexity, bulk and cost of such devices.

OBJECTS AND SUMMARY OF THE INVENTION

An object of the invention is to provide a novel and improved container or cassette for X-ray film which is constructed and assembled in such a way that the film is automatically held in an optimum position with respect to the intensifying screen as soon as the container is closed.

Another object of the invention is to provide a container wherein the means for sealing the interior of the container performs additional useful functions.

A further object of the invention is to provide a container which is especially suited to receive film serving for the making of X-ray images of female breasts.

An additional object of the invention is to provide a container which is simpler and less expensive but more versatile than heretofore known containers.

Another object of the invention is to provide a container which can be used in conventional radiographic apparatus as a superior substitute for heretofore known containers.

An ancillary object of the invention is to provide a novel and improved deformable connection between the sections of a container or cassette for X-ray film.

An additional object of the invention is to provide the container with novel and improved means for sealing its interior against penetration of light.

A further object of the invention is to provide a container which is constructed and assembled in such a way that it can be used for the making of images of the entire breast of a female patient.

The invention is embodied in a container for X-ray film which comprises first and second sections which are preferably made of synthetic plastic material (most preferably a material which is reinforced by glass fibers or the like) and are movable relative to each other between open and overlapping or closed positions, and a flexible foil which may consist of polyurethane or another suitable synthetic plastic material and includes first and second portions which are respectively secured (preferably bonded by adhesive or by welding) to the first and second sections and a third portion which is opaque and extends between the first and second portions to form a hinge about which the sections are movable with respect to each other between open and overlapping positions. It is preferred to make the entire foil of opaque (i.e., light-intercepting) material. The container further comprises means for releasably locking the sections to each other in the overlapping positions and means for evacuating air from the interior of the container when the sections overlap and are locked to each other.

The foil is preferably integral with elongated sealing elements in the form of outwardly flaring lips which are preferably elastic and surround at least a portion of a radiation-admitting opening provided in one of the sections. The sealing elements are preferably provided on one of the first and second foil portions and sealingly engage the other of these foil portions when the sections overlap each other. The film and the intensifying screen are placed within the confines of the sealing elements, preferably in such a way that they extend all the way into the hinge.

The novel features which are considered as characteristic of the invention are set forth in particular in the appended claims. The improved container itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of a container which embodies one form of the invention and is shown in open position; and FIG. 2 is an enlarged fragmentary sectional view of a modified container.

DESCRIPTION OF THE PREFERRED EMBODIMENTS

FIG. 1 shows a flat container or cassette including a first or bottom section 1 which is a substantially rectangular panel having two parallel marginal portions provided with cutouts 1A for hook-shaped coupling members 2 of a quick-release locking device. The container further includes a U-shaped second section or cover 7 which resembles a shallow tray with a U-shaped bottom panel 7a and three marginal portions or side walls 7b, 7c, 7d. The side walls 7b and 7d carry reciprocable coupling members 8 which can engage the respective hook-shaped coupling members 2 when the container is closed, i.e., when the section 7 is moved against the section 1 and/or vice versa so that the panel 7a overlies the section 1.

The section 1 is formed with a patient data window 4 which contains a light-transmitting pane 4A and registers with an aperture 14 of a flexible sheet or foil 9. Furthermore, the section 1 has a dosage-observation window 3. Still further, the section 1 is formed with a port or bore 5 which is or can be connected with a suction pipe 6 which, in turn, is connected with a suction generating device (not shown) serving to evacuate air from the interior of the closed container.

The foil 9 includes a first portion 9a which is bonded to the inner side of the section 1 (preferably in such a way that it overlaps the entire inner side of the section 1) and a second portion 9b which is bonded to the inner side of the panel 7a and overlies a radiation-admitting opening 7A which is surrounded by the panel 7a. The foil portion 9A between the portions 9a, 9b constitutes a simple light-tight hinge which pivotably connects the sections 1 and 7 to each other. In order to reduce the likelihood of forcible separation of the foil 9 from the sections 1 and 7 in response to the application of unexpectedly pronounced stresses, the container preferably comprises reinforcing elements in the form of small plates 10 which are adjacent to the ends of the hinge 9A and are secured to the section 1 and to the panel 7a so as to clamp the foil portions 9a, 9b to the section 1 and to the panel 7a. Thus, in addition to performing a light-intercepting and sealing and, if necessary, a contrast-enhancing or intensifying function, the foil 9 constitutes a simple but reliable hinge 9A which replaces the customary mechanical hinges of conventional containers.

The portion 9b of the foil 9 is formed with integral deformable elastic sealing lips 11 which are inwardly adjacent to the side walls 7b, 7c and 7d of the section 7 and bear against that portion (9a) of the foil 9 which overlies the section 1, when the container is closed. The sealing lips 11 preferably flare outwardly, i.e., toward the respective side walls 7b–7d, and cross each other at the corners between the side walls 7b, 7c and 7c, 7d. Those portions of the lips 11 which extend outwardly beyond the crossing points merge gradually into the inner side of the foil portion which overlies the panel 7a; this is shown at 11A. Furthermore, the sealing lips 11 which are adjacent to side walls 7b and 7d have extensions 11a of lesser or gradually diminishing height which merge into the foil portion 9a overlying the section 1 at the respective ends of the hinge 9A. When the container is closed, the three parts of the panel 7a urge the respective lips 11 toward the section 1 to insure a reliable sealing action. The extensions 11a assist in establishment of seals at the ends of the hinge 9A. If desired, a fourth sealing lip can be provided adjacent to the hinge 9A, especially if the panel 7a has a part which extends along the hinge or when the radiation-admitting opening 7A is omitted. It has been found that the construction which is shown in FIG. 1 is highly satisfactory, especially in view of the provision of extensions 11a. The advantages of using a container wherein the radiation admitting opening extends all the way to the hinge 9A will be explained below.

The thickness of sealing lips 11 (including their crossing points) is selected in such a way that they can properly engage the inner side of the foil portion 9a which overlies the section 1 when the container is closed and contains a sheet or plate of X-ray film or a sandwich consisting of a film and a contrast-enhancing or intensifying screen other than the foil 9. The height of the crossing points 11A of the lips 11 is slightly less than the height of the major portions of such lips 11 because the flexibility of the crossing points 11A is less pronounced. Such height equals or slightly exceeds the thickness of a sandwich including an X-ray film and an intensifying screen.

The portion 9a of the foil 9 has a hole 12 which registers with the port 5 of the section 1. This hole is surrounded by a U-shaped or similar protuberance or bead 13 to insure that the pipe 6 can draw air from the space between the portions 9a and 9b of the foil 9 when the container is closed. The height of the protuberance 13, as considered at right angles to the plane of the foil portions 9a overlying the section 1, is less than the height of the sealing lips 11. The protuberance 13 prevents the foil portion 9b which overlies the panel 7a from sealing the hole 12 when the container is closed.

The purpose of the window 4 is to allow for exposure of patient data onto the film portion which is in register with the aperture 14. Such data are exposed by light prior to or during exposure of a patient to X-rays. The pane 4A airtightly seals the window 4 and consists of a light-transmitting material to permit exposure of the adjacent film portion to light. The bond between section 1 and the adjacent portion 9a of the foil 9 is such that no air or light can penetrate to the inner side of the section 1.

It is desirable to select the material of the foil 9 in such a way that it prevents penetration of light as well as that it absorbs a certain amount of radiation. Furthermore, the foil 9 is preferably highly elastic and conductive. The conductivity insures that, when the foil 9 is cleaned, it does not accumulate an electrostatic charge which could attract particles of dust or other contaminants.

The provision of opening 7A in the panel 7a results in a reduction of absorption of X-rays by the section 7. This renders it possible to reduce the dosage of X-rays to which the patient is exposed.

The improved container is utilized as follows.

Opening and loading of the container take place in a dark chamber to permit insertion of unexposed film and of an intensifying screen of contrast-enhancing material. The sealing lips 11 facilitate proper insertion of film and screen into the opened container. The container is then closed and locked by moving the coupling members 8 into engagement with the respective coupling members 2. The closed container is thereupon placed onto a table or an analogous support, and the pipe 6 is connected to the suction generating device to evacuate air from the space between the two main portions 9a, 9b of the foil 9. This causes the portions 9a, 9b of the foil 9, the film and the intensifying screen to form a thin package wherein the neighboring sheets are immediately adjacent to each other. The container is oriented in such a way that object-modulated X-rays can impinge upon the foil portion 9b which overlies the inner side of the panel 7a, i.e., radiation penetrates through the opening 7A. The hinge 9a is adjacent to and preferably contacts the chest of the patient so that the breast or breasts can overlie the exposed side of the section 7 and can be imaged all the way to the hinge 9A. In fact, the container allows for imaging of the chest immediately behind the breasts because the film and the contrast-enhancing foil can extend all the way to the hinge 9A.

FIG. 2 shows a portion of a modified container wherein the pipe 6 is replaced by a different hollow portion of air evacuating means, namely, by a suction head 106 whose inner end registers with the hole 112 of the foil portion 109a which is bonded (adhesively secured or welded) to the inner side of the bottom section 101 of the container. The protuberance 113 corresponds to the protuberance 13 of FIG. 1.

The suction head 106 may contain a light-intercepting filter (indicated at 206). The mounting of the suction head 106 is preferably such that it is recessed into the outer side of the bottom section 101 so that the latter can slide along a table or support T into register with a conduit or channel CH serving to connect the suction head 106 with the suction generating device. The table T may be provided with means for facilitating the placing of the open underside of the suction head 106 into register with the channel CH.

The sections of the improved container preferably consist of a suitable rigid synthetic plastic material which may be reinforced by glass fibers or the like. The foil 9 or 109 also consists of a synthetic plastic material, such as polyurethane. It can be formed integrally with the sealing lips 11, e.g., in an injection molding machine. The manner in which the first and second portions 9a, 9b of the foil are bonded to the inner sides of the respective sections 1, 7 can be chosen practically at will, e.g., one can resort to a suitable adhesive or to an appropriate welding technique.

An important advantage of the improved container is that the rudimentary hinge 9A occupies a minimum of space and therefore allows for placing of the respective marginal portion of the film in immediate proximity of the object or body to be examined. Another advantage of the container is that it can be opened through more than 180 degrees. Furthermore, the outer side of the hinge 9A is smooth so that it is not uncomfortable to and cannot injure a patient. This is in contrast to conventional hinges which are likely to hurt or cause discomfort to a patient. The foil 9 can be readily replaced when it exhibits a leak or is otherwise damaged, i.e., all other parts of the container can be reused for assembly with a fresh foil 9. The container is sufficiently stable to be capable of use in radiographic apparatus having automatic loading and evacuating means for cassettes.

An additional advantage of the improved container is that the inner side of the foil 9 can be readily cleaned and that such foil does not form hard-to-reach corners which would accumulate dust or other foreign matter. Moreover, the foil 9 constitutes a hinge 9A as well as a seal 11 between the sections 1 and 7. Still further, and as already explained above, the film can be inserted in such a manner that it extends all the way to the hinge 9A; this allows for imaging of breast portions in immediate proximity to the chest.

The improved container can be used as a superior substitute for aforedescribed conventional containers with discrete metallic or other rigid hinges and separate sealing means, as well as a superior substitute for containers which employ plastic envelopes for a sheet or plate of X-ray film and an intensifying screen. Such envelopes are normally sealed by resorting to a clamp. The insertion of film and screen into the envelope, the application of clamp to the envelope and the insertion of envelope into a conventional container are time-consuming operations. Moreover, the envelope is likely to develop folds or creases which deform the film and prevent the deformed film from assuming an optimum position with respect to the object or subject and the source of X-rays. Finally, the cleaning of envelopes presents problems, i.e., the images of particles of dust which is likely to accumulate therein are not readily distinguishable from microchalk so that the likelihood of faulty diagnoses is always present.

As mentioned above, the foil 9 can constitute an intensifying screen. Utilization of discrete intensifying screens is preferred at this time because such screens are highly sensitive to mechanical damage. Thus, instead of utilizing a highly sensitive foil which is also an intensifying screen, the screen is preferably placed into the foil together with a sheet of X-ray film.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. A container for X-ray film, comprising a rigid housing including a first and a second section, said sections being movable with respect to each other between overlapping and open positions; and a flexible foil having first and second portions respectively affixed to and substantially coextensive with said first and second sections and constituting an internal lining of said housing, and a light-intercepting third portion disposed intermediate said first and second portions of said foil and constituting a hinge about which said sections of said housing are movable between said open and overlapping positions.

2. The container of claim 1, further comprising means for releasably locking said sections to each other in said overlapping positions thereof, and means for evacuating air from the interior of said container in the overlapping positions of said sections.

3. The container of claim 1, wherein said first section has a plurality of marginal portions of said first portion of said foil comprises sealing elements extending along at least some of said marginal portions and sealingly engaging said second section or said second portion of said foil in said overlapping position of said sections.

4. The container of claim 1, wherein said sections have inner sides and said first and second portions of said foil are bonded to the inner sides of the respective sections.

5. The container of claim 1, wherein said first section has a radiation-admitting opening and said second section has a window and a light-transmitting pane sealingly received in said window, said second portion of said foil having a cutout in register with said window.

6. The container of claim 1, wherein said sections consist of synthetic plastic material.

7. The container of claim 1, wherein said sections consist of synthetic plastic material reinforced by glass fibers.

8. The container of claim 1, wherein said first and second portions of said foil are welded to said first and second sections, respectively.

9. The container of claim 1, wherein one of said sections has a radiation-admitting opening and said foil comprises elastic sealing elements surrounding at least a portion of said opening.

10. The container of claim 1, further comprising means for evacuating air from the interior of said container in the overlapping positions of said sections, said evacuating means comprising a hollow portion connected to said first section, said first section having a port in communication with said hollow portion and said first portion of said foil having a hole in register with said port.

11. The container of claim 10, wherein said hollow portion is a suction pipe.

12. The container of claim 1, wherein said foil consists of opaque synthetic plastic material.

13. The container of claim 12, wherein said synthetic plastic material is polyurethane.

14. The container of claim 1, wherein one of said sections comprises a substantially U-shaped panel defining a radiation-admitting opening extending to said hinge, said panel having an inner side and the respective portion of said foil being bonded to said inner side.

15. The container of claim 14, wherein that portion of said foil which is bonded to said panel comprises elongated deformable sealing elements surrounding said opening and sealingly engaging the other of said sections or the corresponding portion of said foil in the overlapping positions of said sections.

16. A container for X-ray film, comprising a first and a second section, said sections being movable with respect to each other between overlapping and open positions, and one of said sections including a substantially U-shaped panel defining a ratiation-admitting opening extending to said hinge, said panel having an inner side; and a flexible foil having first and second portions respectively secured to said first and second sections and a light-intercepting third portion disposed intermediate said first and second portions and constituting a hinge about which said sections are movable between said open and overlapping positions, that portion of said foil which is secured to said panel being bonded thereto and including elongated deformable sealing elements surrounding said opening and sealingly engaging the other of said sections or the corresponding portion of said foil in the overlapping position of said sections, two of said sealing elements having extensions extending across said hinge.

17. The container of claim 16, wherein the thickness of said extensions is less than the thickness of the remaining portions of the respective sealing elements.

18. A container for X-ray film, comprising a first and a second section, said sections being movable with respect to each other between overlapping and open positions; a flexible foil having first and second portions respectively bonded to said first and second sections and a light-intercepting third portion disposed intermediate said first and second portions and constituting a hinge about which said sections are movable between said open and overlapping positions; reinforcing means for mechanically securing said first and second portions of said foil to the respective sections.

19. The container of claim 18, wherein said reinforcing means comprises metallic plates adjacent to said hinge.

20. A container for X-ray film, comprising a first and a second section, said sections being movable with respect to each other between overlapping and open positions; a flexible foil having first and second portions respectively secured to said first and second sections and a light-intercepting third portion disposed intermediate said first and second portions and constituting a hinge about which said sections are movable between said open and overlapping positions; and means for evacuating air from the interior of said container in the overlapping positions of said sections, said evacuating means comprising a hollow portion connected to said first section, said first section having a port in communication with said hollow portion and said first portion of said foil having a hole in register with said port and an inner side provided with a protuberance adjacent to said hole to prevent sealing of said hole in overlapping positions of said sections.

21. The container of claim 20, wherein one of said sections has a radiation-admitting opening and said foil has elongated sealing elements surrounding said opening in overlapping positions of said sections, the height of said sealing elements exceeding the height of said protuberance, as considered at right angles to said inner side.

22. A container for X-ray film, comprising a first section having a radiation-admitting opening, and a second section having a window and a light-transmitting pane sealingly received in said window, said sections being movable with respect to each other between overlapping and open positions; and a flexible foil having first and second portions respectively secured to said first and second sections and a light-intercepting third portion disposed intermediate said first and second portions and constituting a hinge about which said sections are movable between said open and overlapping positions and said second portion of said foil having a cutout in register with said window.

23. A container for X-ray film, comprising a first and a second section, said sections being movable with respect to each other between overlapping and open positions one of said sections having a radiation-admitting opening; and a flexible foil having first and second portions respectively secured to said first and second sections and a light-intercepting third portion disposed intermediate said first and second portion and constituting a hinge about which said sections are movable between said open and overlapping positions, said foil comprising elastic sealing elements surrounding at least a portion of said opening, said sealing elements being integral with one of said first and second portions of said foil and sloping outwardly toward the nearest marginal portions of the corresponding section.

24. A container for X-ray film, comprising a first and a second section, said sections being movable with respect to each other between overlapping and open positions one of said sections having a radiation-admitting opening; and a flexible foil having first and second portions respectively secured to said first and second sections and a light-intercepting third portion disposed intermediate said first and second portions and constituting a hinge about which said sections are movable between said open and overlapping positions, said foil comprising elastic sealing elements surrounding at least a portion of said opening, said sealing elements crossing each other and including portions of reduced height extending outwardly beyond the respective crossing points, the height of such crossing points being less than the height of the major portions of said sealing elements.

* * * * *